(12) United States Patent
Lee et al.

(10) Patent No.: US 6,880,160 B1
(45) Date of Patent: Apr. 12, 2005

(54) DEVICE FOR TRANSFERRING A DISK IN A DISK DRIVE

(75) Inventors: In Ho Lee, Euiwang (KR); Jeong Yeol Yang, Kunpo (KR)

(73) Assignee: LG Electronics Inc., Seoul (KR)

( * ) Notice: Subject to any disclaimer, the term of this patent is extended or adjusted under 35 U.S.C. 154(b) by 173 days.

(21) Appl. No.: 09/617,430

(22) Filed: Jul. 14, 2000

(30) Foreign Application Priority Data

Jul. 14, 1999 (KR) ........................................ 1999-28527
Jul. 14, 1999 (KR) ........................................ 1999-28537

(51) Int. Cl.$^7$ ............................................. G11B 17/04
(52) U.S. Cl. ..................................... 720/623; 720/626
(58) Field of Search .............................. 720/623, 624; 369/77.1

(56) References Cited

U.S. PATENT DOCUMENTS

| | | | | |
|---|---|---|---|---|
| 4,674,079 A | * | 6/1987 | Agostini ..................... | 369/292 |
| 5,022,023 A | * | 6/1991 | Toyoguchi .................. | 369/75.2 |
| 5,113,388 A | * | 5/1992 | Yamada et al. ............. | 369/270 |
| 5,173,893 A | * | 12/1992 | Morikawa et al. ......... | 369/75.2 |
| 5,255,255 A | * | 10/1993 | Kaneda et al. ........... | 360/99.07 |
| 5,872,757 A | * | 2/1999 | Park .......................... | 369/75.1 |
| 6,028,831 A | * | 2/2000 | Scholz et al. .............. | 369/75.2 |
| 6,288,982 B1 | * | 9/2001 | Kato ....................... | 369/30.36 |

* cited by examiner

*Primary Examiner*—David Davis
(74) *Attorney, Agent, or Firm*—Birch, Stewart, Kolasch & Birch, LLP

(57) ABSTRACT

A disk transferring device including a chassis; a moving unit which is tightly in contact with one surface of a disk and rotated by the force of a driving source for thereby moving the disk; a balance guide unit for contacting an inserted disk for thereby precisely inserting the disk; a holder guide unit which interlocks with the balance guide unit and is guided by the balance guide unit for thereby receiving the disk moved by a roller unit and guiding the disk until the disk transfer is finished; a selection guide unit which interlocks with the holder guide unit, is moved by the insertion power of the disk, and is interlocked according to the size of the insertion disk; and a clamping driving unit which is driven for the clamping operation of the disk, being interlocked with the selection guide unit. The holder guide unit or selection guide unit receives the driving force separated from the disk from the driving source when the disk transfer is finished.

8 Claims, 20 Drawing Sheets

DEVICE FOR TRANSFERRING A DISK IN A DISK DRIVE

BACKGROUND OF THE INVENTION

1. Field of the Invention

The present invention relates to a disk drive, and in particular, to a disk transferring and clamping device for a disk drive by which the disk drive is lightened, thinned, shortened, and miniaturized and a disk is guided precisely during disk transfer.

2. Description of the Background Art

FIG. 1 is a plane view illustrating the construction of a disk transferring device for a roller-type disk drive in accordance with the conventional art, and FIG. 2 is a side sectional view illustrating the construction of a disk transferring device for a roller-type disk drive in accordance with the conventional art.

As illustrated therein, the disk drive is externally constructed of a frame 1, said frame 1 having elements for driving a disk D. A front plate 2 is installed at the front of the frame 1, and a slot 2a which the disk D is inserted into or extracted from is formed at the front plate 2. A loading motor (not shown) for loading or unloading the disk D is installed at one inner side of the frame 1, and a roller 3 rotated by a driving force of the loading motor (not shown) is horizontally installed inside the frame 1.

Here, the roller 3 is made of a material being elastic and exhibiting a predetermined extent of friction force, such as rubber. The roller 3 is supported by a roller bracket 4, and one end of the roller bracket 4 is connected to a spring 4c. Thus, the roller 3 pivots on a hinge 4a in a clockwise direction, and accordingly it is likely to be firmly in contact with a lower recording surface of the disk D by the roller bracket 4.

A timing plate 5 operated by the disk D when the disk D is inserted a certain amount on a connecting plate 6, and a driving plate 7 is installed on the frame 1 at a lower side of the timing plate 5.

A rack gear portion 7a is formed at one side of the driving plate 7, and the rack gear portion 7a, engaged with a loading gear G installed on the frame 1, drives the driving plate 7. A guide sloping portion 7b is formed at a front end portion of the driving plate 7, that is, at the driving plate 7 on a lower side of the roller bracket 4, and an interlocking extrusion portion 7c for interlocking with the timing plate 5 is formed at a rear end portion thereof. An interlocking pin 4b provided at the roller bracket 4 is in contact with the guide sloping portion 7b. A guide flap 8 curved in a vertical upward direction for thereby forming a lifting guide slot 8a is provided at a rear end portion of the driving plate 7. A spindle motor 9 for rotating the disk D is installed at the center of the inside of the frame 1, and a turn table 10 on which the disk D is mounted is installed at the rotating shaft of the spindle motor 9.

In addition, a clamp plate 11 is installed inside the frame 1 so that its free end portion can be lifted at a predetermined angle from a hinge pin 11a, and a lifting guide boss 11b is formed at one side of the clamp plate 11 to be guided along the lifting guide slot 8a of the guide flap 8 driven together with the driving plate 7, thus achieving the lifting of the clamp plate 11. At the free end portion of the clamp plate 11, a clamp 12 for holding the disk D mounted on the turntable 10 is installed.

In the drawings, reference letter S denotes a sensor for sensing the insertion and extraction of the disk D, which is installed at a front end portion of the frame 1.

The operation of the disk transferring device in accordance with the present invention thusly constructed will now be described. In order to load the disk D, when a user inserts the disk D via the slot 2a of the front plate 2, the sensor S senses the insertion of the disk D to thereby drive the loading motor (not shown). When the loading motor (not shown) is driven, the roller 3 is rotated. The roller 3 is firmly in contact with the lower recording surface of the disk D by elastic force of the spring 4c acting upon the disk D of the roller 3 for thereby moving the disk D into the disk drive.

When the disk D is inserted so that it is located above the turntable 10, the timing plate 5 is moved in an arrow direction A of FIG. 1. When the timing plate 5 is moved a certain amount, the rack gear portion 7a of the driving plate 7 engages with the loading gear G for thereby moving the driving plate 7 by the driving force of the loading motor (not shown). With the movement of the driving plate 7, the interlocking pin 4b of the roller bracket 4 in contact with the sloping portion 7b of the driving plate 7 is guided along the sloping portion 7b, and the roller bracket 4 pivots on the hinge pin 4a in a counterclockwise direction, whereby the roller bracket 4 is separated from the lower surface of the disk D and the disk D is mounted on the turn table 10. With the movement of the driving plate 7, the guide boss 11b of the clamp plate 11 located at the lifting guide slot 8a of the guide flap 8 is guided along the lifting guide slot 8a, and the clamp plate 11 is lowered by pivoting on the hinge pin 11a in the clockwise direction.

As the clamp plate 11 is lowered, a clamp 12 provided on the clamp plate 11 clamps the disk D mounted on the turn table 1, and the operation of reproducing or recording a signal of the disk D may begin.

Meanwhile, the unloading operation of the disk D is achieved in a reverse manner to the above loading operation.

However, in the disk transferring device in accordance with the conventional art thusly described, the construction for guiding the disk D functions as a load in the transferring of the disk D for thereby greatly loading the roller. Thus, there is a problem that the roller is abraded and its life span is shortened so that the disk D cannot be precisely moved onto the turntable.

In addition, there is another problem that the signal recording surface of the disk D is stained with debris generated due to the abrasion of the roller so that an error is occurred when reading or reproducing a recorded signal.

In the above-described conventional construction, the overall size of the device is so large that it goes against the tendency of lightening, thinning, shortening, and miniaturizing the disk drive. Thus, there is still another problem that a disk of a certain size, for example, only one of a 12 cm disk and an 8 cm disk can be used.

SUMMARY OF THE INVENTION

Accordingly, the present invention provides a disk transferring and clamping device which is capable of precisely guiding a disk during the movement of the disk.

The present invention provides a disk transferring and clamping device included in a lightened, thinned, shortened, and miniaturized disk drive.

The present invention to provides a disk transferring and clamping device allowing disks of different diameters to be used in one disk drive.

A disk transferring and clamping device for a disk drive according to the present invention includes: a chassis; a moving unit which is firmly in contact with one surface of a disk and rotated by the force of a driving source for thereby moving the disk; a balance guide unit for contacting an inserted disk for thereby precisely inserting the disk; a holder guide unit which interlocks with the balance guide unit and is guided by the balance guide unit for thereby receiving the disk moved by a roller unit and guiding the disk until the disk transfer is finished; a selection guide unit which interlocks with the holder guide unit, is moved by the insertion power of the disk, and is interlocked according to the size of the insertion disk; and a clamping driving unit which is driven for the clamping operation of the disk, being interlocked with the selection guide unit.

The holder guide unit or selection guide unit receives the driving force from the driving source when the disk transfer is finished. The holder guide unit interlocks with the clamping driving unit for thereby being separated from the disk. The selection guide unit interlocks with the clamping driving unit for thereby being separated from the disk.

In the case that the disk drive itself is transported by being vertically raised or moved in a direction vertical to the ground, a vertical guide unit for supporting the perimeter of the disk is further included. The vertical guide unit interlocks with the construction for lifting the roller unit for thereby being separated from the disk when the disk transfer is finished.

The construction for lifting the roller unit includes a lifting plate having a guide hole and a guide slot installed at both ends of the roller unit for thereby lifting the roller unit by means of a cam portion. A guide slot having a partial insertion preventing unit is formed on the chassis, a balance guide unit is installed at both ends of the chassis near a disk insertion opening, a guide rod contacting the perimeter portion of the disk during disk insertion is installed at one end of the balance guide unit, and a connecting pin inserted into the guide slot is installed at the other end thereof.

The power of the driving source is transmitted through a main power transmission system having a plurality of gears for transmitting the driving force of the driving source; a disk transferring power transmission system having a plurality of gears for receiving the driving force from the main power transmission system and converting the same to the transferring of the disk; and a clamping power transmission system for selectively receiving the driving force from the main power transmission system and converting the same to the clamping driving of the disk.

The clamping power transmission system includes a driving plate for receiving its power and transmitting the power to the lifting plate, the driving plate having a rack gear portion whereby, a first gear tooth of the rack gear portion is formed to have a rounded shape for thereby preventing collisions with the opposite gear tooth engaged with the first gear tooth. At the driving plate, a selection slot for selectively guiding the selection guide unit according to the type of disk inserted is formed.

A disk transferring and clamping device for a disk drive includes: a driving source for providing power for the transferring and clamping of a disk; guide levers for guiding the disk moved by the power of the driving source; and a guide unit for additionally guiding the guide lever by performing a power connecting function for the clamping of the disk according to the size of the disk. The guide unit is a guide slot additionally formed at the driving plate for selectively receiving the power for clamping the disk from the driving source and transmitting the same to the construction for clamping the disk and the construction for lifting the roller for the purpose of disk transfer.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

A preferred embodiment of the present invention is now described with reference to the attached drawings.

Figure 1:
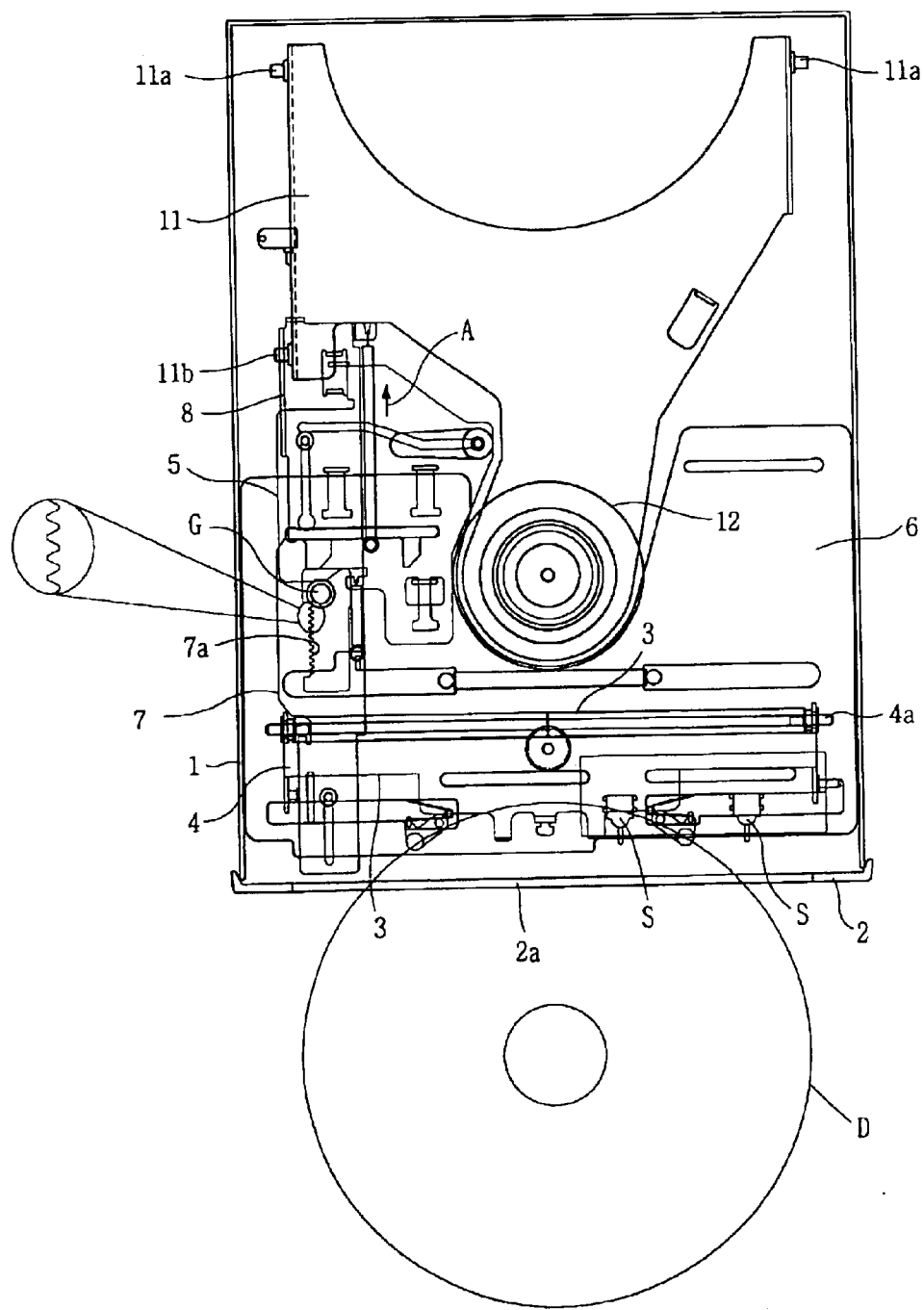
FIG. 1 is a plane view illustrating the construction of a disk transferring and clamping device for a roller-type disk drive in accordance with the conventional art.
Figure 2:
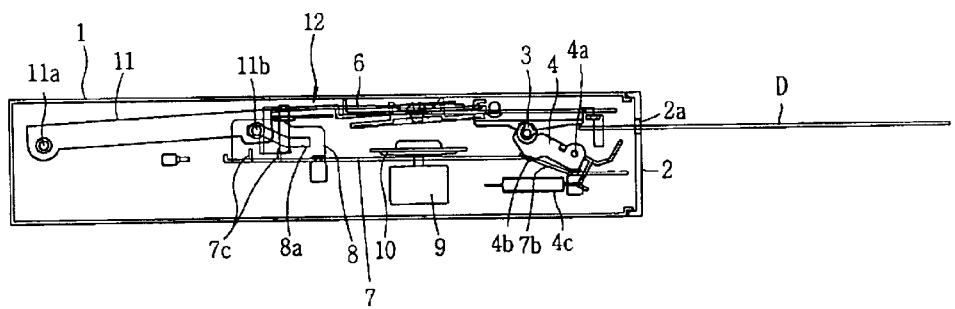
FIG. 2 is a side sectional view illustrating the construction of a disk transferring and clamping device for a roller-type disk drive in accordance with the conventional art.
Figure 3:
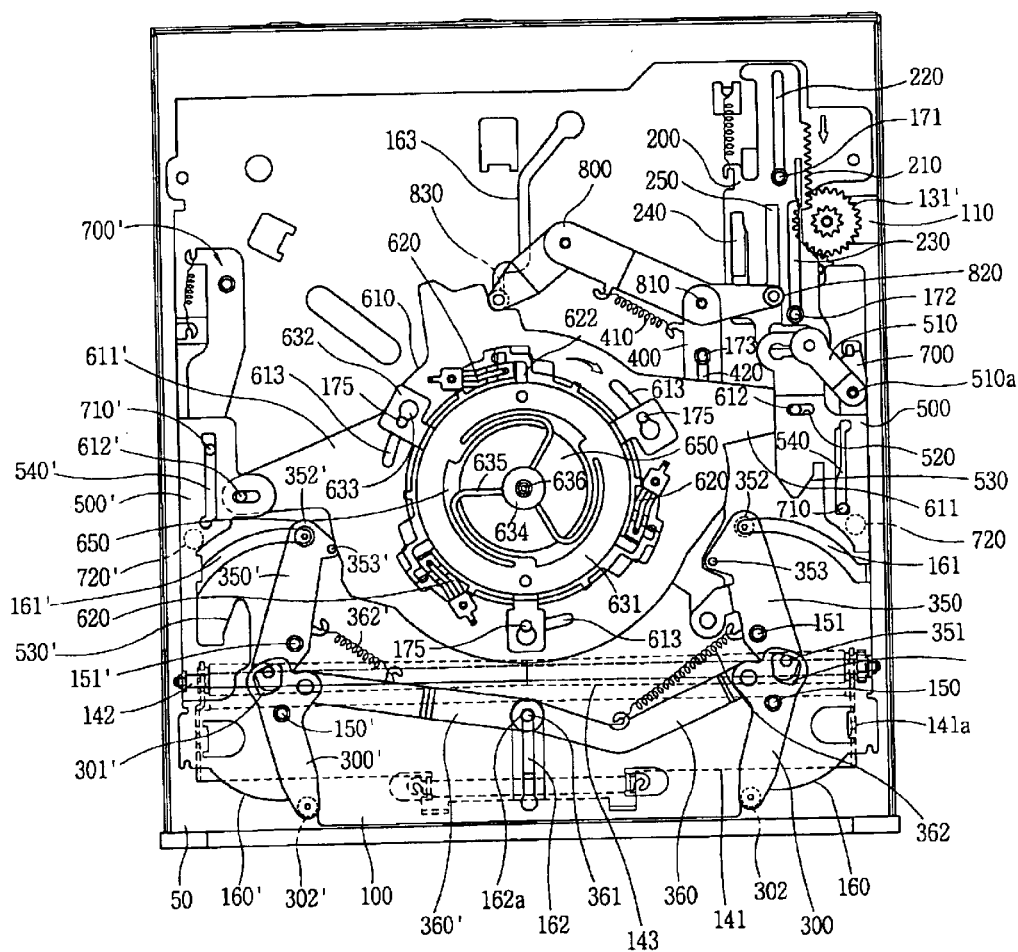
FIG. 3 is a plane view illustrating the construction of a disk drive having a disk transferring and clamping device in accordance with the present invention.
Figure 4:
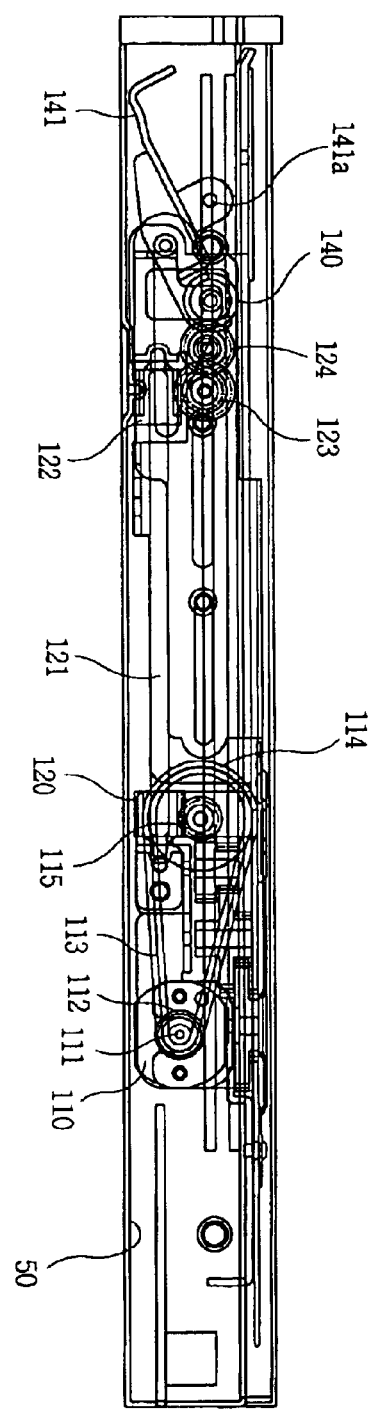
FIG. 4 is a side sectional view illustrating the construction of a disk drive having a disk transferring and clamping device in accordance with the present invention.

FIG. 3 is a plane view illustrating the construction of a disk drive having a disk transferring and clamping device in accordance with the present invention, and FIG. 4 is a side sectional view illustrating the construction of a disk drive having a disk transferring and clamping device in accordance with the present invention.

Figure 5A:
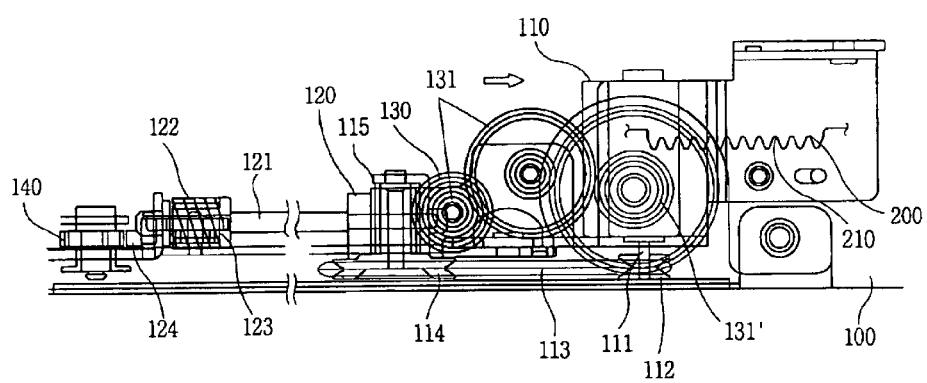
FIG. 5A is a plane view illustrating a power transmission path in a disk drive in accordance with the present invention.
Figure 5B:
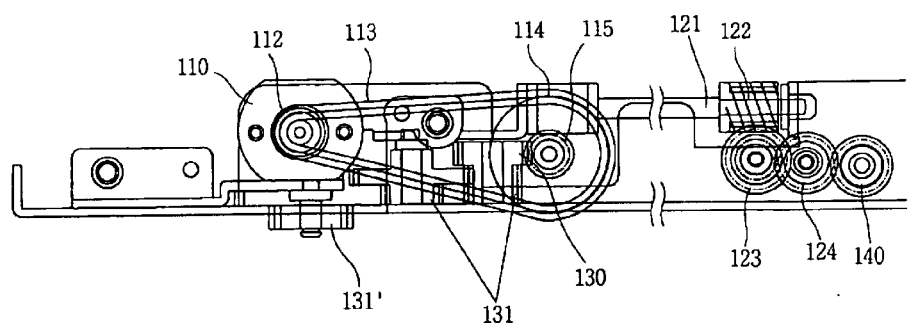
FIG. 5B is a side view illustrating a power transmission path in a disk drive in accordance with the present invention.

In addition, FIG. 5A is a plane view illustrating a power transmission path in a disk drive in accordance with the present invention, and FIG. 5B is a side view illustrating a power transmission path in a disk drive in accordance with the present invention.

As illustrated therein, the disk drive is divided into inner and outer portions by a main chassis 50 and an upper chassis 100 connected to an upper portion of the main chassis 50, and a pickup unit (not shown) required for recording and reproducing a disk, a transferring device for transferring the disk, and a clamping device for clamping the disk are installed at the inner portion thereof. The construction of the pickup unit (not shown) is not the focus of the essentials of the present invention, so the detail description thereof is omitted.

First of all, a disk is positioned onto the center portion of the main chassis 50, and a turn table (not shown) rotated by a spindle motor (not shown) receives the disk. As illustrated in FIG. 3, a driving motor 110 for providing power for the transferring and clamping of the disk is installed at one end of the upper chassis 100.

As illustrated in FIGS. 5A and 5B, the driving power of the driving motor 110 is transmitted to a slave pulley 114 via a belt 113 wrapped around a driving pulley 112 installed at the rotating shaft 111 of the driving motor 110. A driving worm 115 is coaxially installed with the slave pulley 114, said driving worm 115 is engaged with a loading worm wheel 120 and a clamping worm wheel 130, so that it simultaneously transmits power to a disk transferring path and a disk clamping path.

The loading worm wheel 120 engages with the driving worm 115, being installed at a connecting shaft 121. At the end portion of the opposite side of the connecting shaft 121, a slave worm wheel 122 is installed. The slave worm wheel 122 is engaged with a first loading gear 123, said first loading gear 123 being engaged with a second loading gear 124, said second loading gear 124 being engaged with a roller gear 140, said roller gear 140 being coaxially installed with a roller shaft 142 to be described below.

In addition, the clamping worm wheel 130 is sequentially engaged with a plurality of driving gears 131, and the last driving gear 131' among the driving gears 131 is installed so that it is selectively engaged with a rack gear portion 210 of a driving plate 200 installed on the upper chassis 100.

Meanwhile, a roller bracket 141 is installed at a lower surface of the front end portion of the upper chassis 100 as shown in FIG. 4.

As shown in FIG. 3, a roller shaft 142 is lengthily installed at the roller bracket 141 in a horizontal direction, and a roller 143 is installed at the roller shaft 142. The roller bracket 141 is installed to be pivotable on a hinge point 141a at both ends, and the roller 143 is always elastically supported by a spring 144 shown in FIG. 8, being biased toward the bottom surface of the upper chassis 100. The roller 143, which is generally made of rubber, is in contact with a lower surface of a disk D and transfers the disk by its friction force.

Hereinafter, the construction of a disk transferring device for guiding a disk transfer will now be described with reference FIG. 6.

Figure 6:
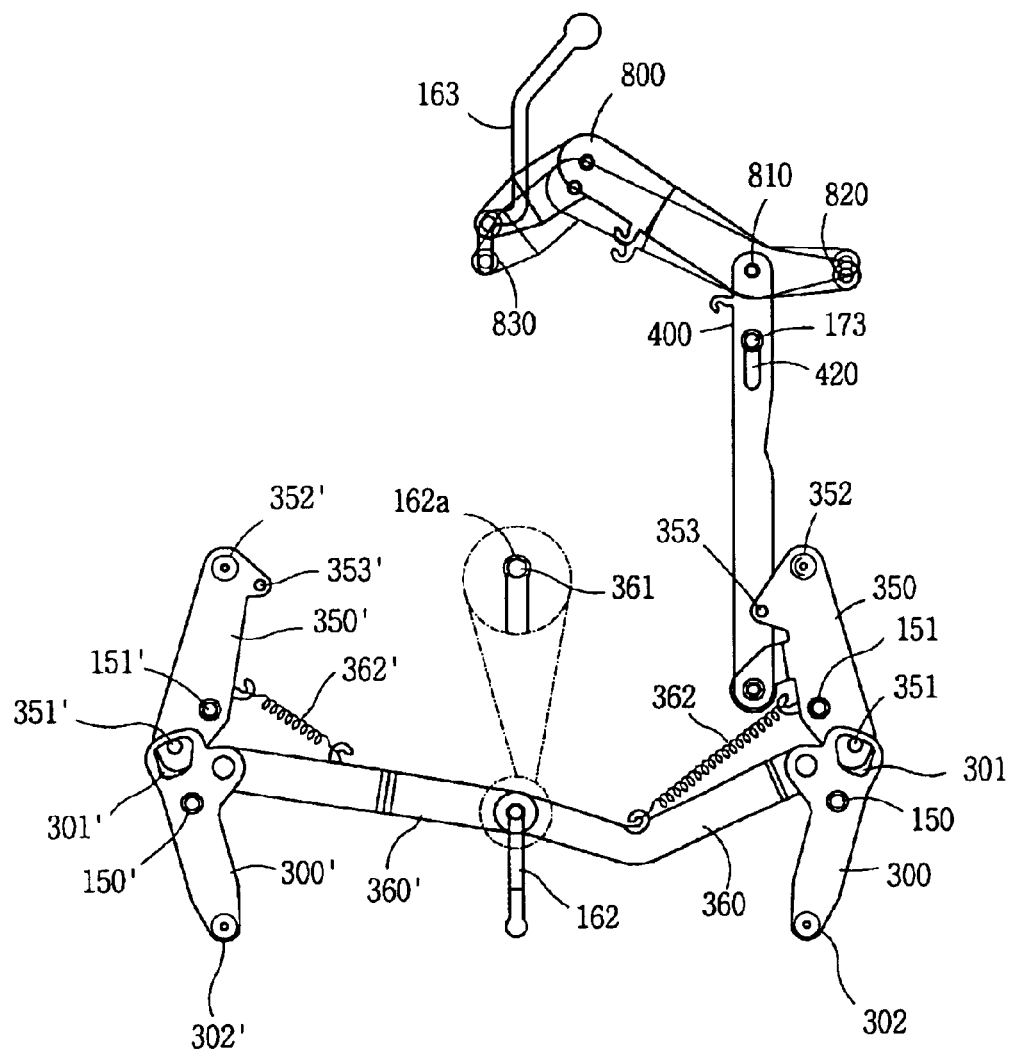
FIG. 6 is a plane view illustrating the construction of a lever for guiding a disk in a disk drive in accordance with the present invention.

FIG. 6 is a plane view illustrating the construction of a lever combination for guiding a disk in a disk drive in accordance with the present invention. First and second balance levers 300 and 300' are installed at a top surface of the upper chassis 100 to be symmetrical with first and second holder levers 350 and 350' respectively connected to these balance levers 300 and 300'. The first and second balance levers 300 and 300' are installed to be pivotable on first and second hinges 150 and 150' formed on the upper chassis 100, and the first and second holder levers 350 and 350' are installed to be pivotable on third and fourth hinges 151 and 151' formed on the upper chassis 100.

Interlocking holes 301 and 301' are formed respectively on the first and second balance levers 300 and 300', and interlocking bosses 351 and 351' located in the interlocking holes 301 and 301' of the balance levers 300 and 300' are formed at one end of the first and second holder levers 350 and 350'. The operation of the holder levers 350 and 350' is controlled by the relation between the interlocking bosses 351 and 351' and the interlocking holes 301 and 301'.

In addition, first and second balance rods 302 and 302' are protrusively formed at the other end of the first and second balance levers 300 and 300' in a downward direction extending away from the upper chassis 100, and first and second holder rods 352 and 352' are protrusively formed at the other end of the first and second holder levers 350 and 350', for thereby guiding the sides of a disk. Herein, the first and second balance rods 302 and 302' are guided along guide surfaces 160 and 160' formed at both front ends of the upper chassis 100 as shown in FIG. 3 when a disk is inserted, and the first and second holder rods 352 and 352' are guided along first guide slots 161 and 161' formed on the upper chassis 100.

Bosses 353 and 353' are provided at the sides of one end of the first and second holder levers 350 and 350', used to deviate the first and second holder rods 352 and 352' from the sides of a disk when the loading operation of the disk is finished. First and second connecting levers 360 and 360' connected by a connecting pin 361 is connectively installed between the first and second balance levers 300 and 300'. Here, the connecting pin 361 is guided along a slot 162 formed at the upper chassis 100, and a partial insertion preventing unit 162a is formed at one end portion of the slot 162, namely, at a position wherein the connecting pin 361 is present, with the disk not being inserted, as illustrated in an expansion view in a circle of FIG. 6. The first and second connecting levers 360 and 360' are connected with the first and second holder levers 350 and 350' by springs 362 and 362'.

Therefore, the first and second balance levers 300 and 300', the first and second holder levers 350 and 350', and the first and second connecting levers 360 and 360' engage with one another, and the springs 362 and 362' restore all these levers to their original positions when the disk is removed from the disk drive.

In addition, one side of the first holder lever 350 is connected with a selection lever 800 via a supporting lever 400 to be described below.

The construction of a driving means for clamping a disk on the turn table (not shown) will be described with reference to FIGS. 7 and 8.

At one side of the main chassis 50, a driving plate 200 driven by the driving motor 110 via the driving gear 131' is installed. A rack gear portion 210 being engaged with the driving gear 131' is formed at the driving plate 200. A gear tooth 210a being initially engaged with the driving gear 131' is formed to have a rounded shape, and accordingly prevents collisions between the gears when the driving plate 200 begins to be driven by the selection lever 800 and then the rack gear portion 210 engages with the driving gear 131'.

Moving slots 220 and 230 for guiding the movement of the driving plate 200 is formed in a row at the center portion of the driving plate 200. First and second guide pins 171 and 172 formed at the upper chassis are positioned in the moving slots 220 and 230, and are guided therealong when the driving plate 200 is moved forward and backward.

In addition, first and second selection slots 240 and 250 for guiding the selection lever 800 to be described below according to the type of a disk D are formed at one side of the driving plate 200. Here, the first selection slot 240 guides the selection lever 800 in case of a 12 cm disk, and the second selection slot 250 guides the selection lever 800 in case of an 8 cm disk being received by the disk drive.

The selection lever 800 moves the driving plate 200 while being moved by a disk D inserted into the drive, whereby the rack gear portion 210 of the driving plate 200 becomes engaged with the driving gear 131', and the power for clamping the disk D is transmitted to the driving plate 200. The thusly functioning selection lever 800 is installed at one end of the supporting lever 400 to be pivotable on a hinge 810. A guide boss 820 is formed at one end portion of the selection lever 800 to be selectively located in the first and second selection slots 240 and 250, and a supporting rod 830 contacting the perimeter of an inserted disk to be moved by the movement of the disk, is protrusively formed at the other end portion thereof. Herein, the supporting rod 830 is located in a supporting rod slot 163 formed at an upper side of the center of the upper chassis 100.

A supporting lever 400 is installed, of which one end portion being hingeably connected to the selection lever 800 and the other end portion being hingeably connected to the first holder lever 350. The supporting lever 400 is connected to the selection lever 800 by a restoring spring 410 for restoring the supporting lever 400 to an original state when it pivots on the hinge 310. The supporting lever 400 has a moving slot 420 in which a third guide pin 173 fixed on the upper chassis 100 is located. The third guide pin 173 is installed to be movable within the length of the moving slot 420 on the upper chassis 100.

Figure 7:
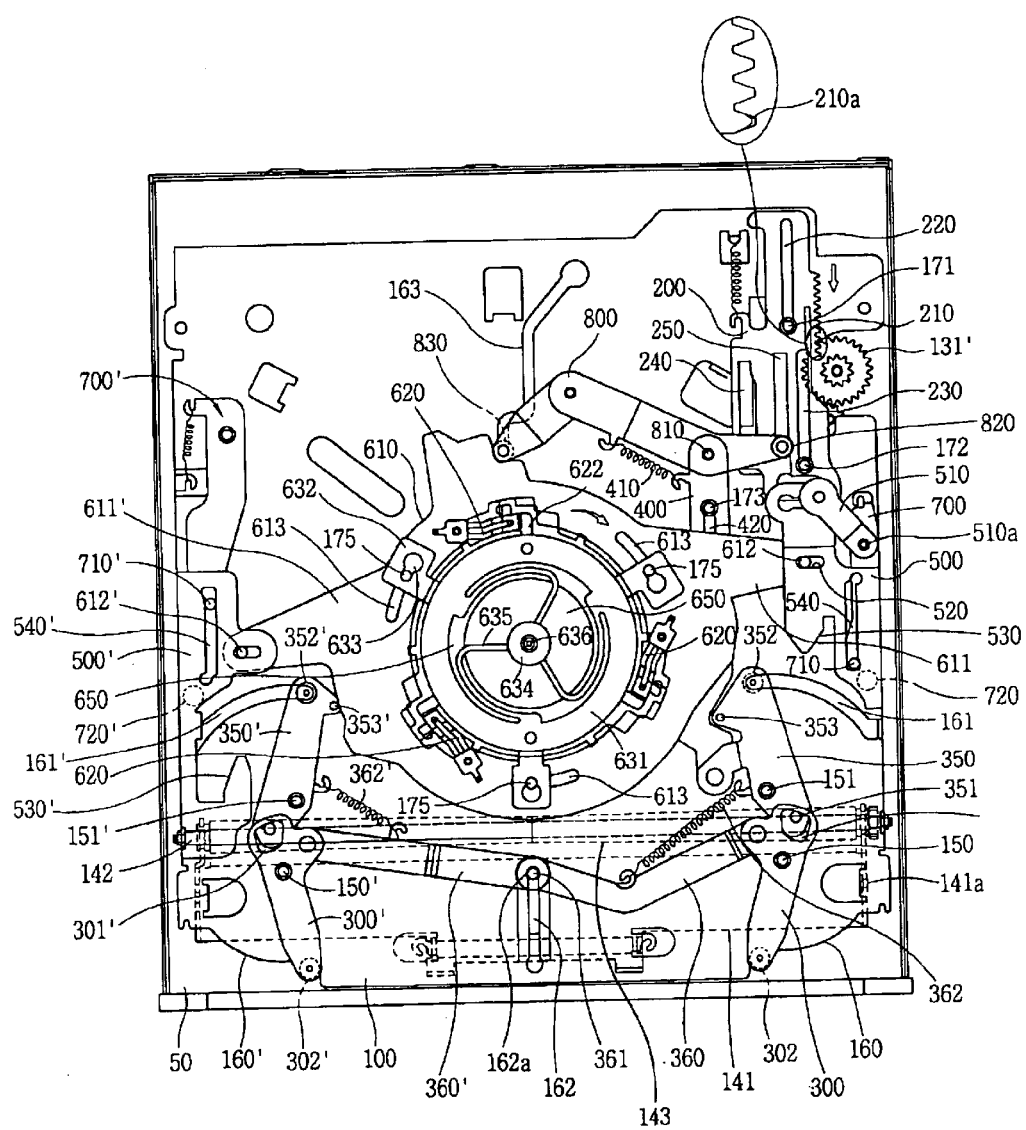
FIG. 7 is a plane view illustrating the construction for clamping a disk in a disk drive in accordance with the present invention.
Figure 8:
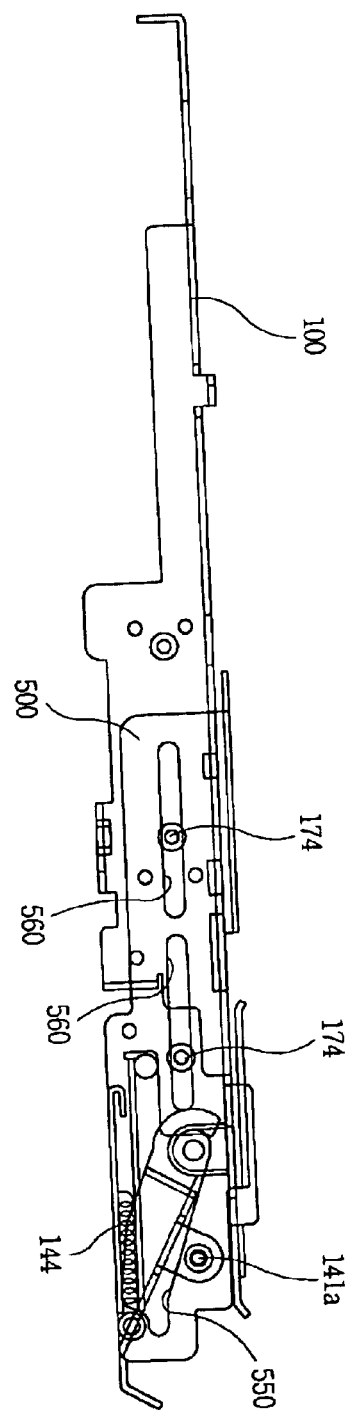
FIG. 8 is a side view illustrating the construction of the essential portion of a disk drive in accordance with the present invention.

A first lifting plate 500 is installed at the upper side of the driving plate 200 to cover parts of the upper and side surfaces of the upper chassis 100 as illustrated in FIGS. 7 and 8, and it is operated in connection with the driving plate 200 by an interlocking lever 510. The interlocking lever 510 is pivotable on a pin 510a installed on the upper chassis 100. The first lifting plate 500 makes a roller 143 to be lifted from the inserted disk by lifting the roller bracket 141, and it transmits driving power by means of a clamping device 600. At the first lifting plate 500, a guide slot 520 is formed in order to transmit the driving force to the clamping driving member 610.

In addition, a cam portion 530 is formed at one end portion of the first lifting plate 500 in order to drive the first holder lever 350 so that a holder rod 352 of the first holder lever 350 is separated from the perimeter of a disk when a disk loading operation is finished, and a first guide slot 540 for interlocking with a vertical guide lever 700 is formed at a predetermined portion next to the cam portion 530.

As illustrated in FIG. 8, a cam hole 550 having a sloping cam portion in order to drive the roller bracket 141 by supporting the roller shaft 142 and second guide slots 560 for guiding the movement of the first lifting plate 500 are formed at the sides of the first lifting plate 500. In the second guide slots 560, fourth guide pins 174 formed at one side of the upper chassis 100 are inserted.

Meanwhile, a second lifting plate 500' functioning in the same manner as the first lifting plate 500 is installed on the upper chassis 100 opposed to the first lifting plate 500. Thus, these two lifting plates 500 and 500' distribute the power of the spring 144 of FIG. 8 elastically supporting the roller bracket 141. Interlocking bosses 710 and 710' located in the first guide slots 540 and 540' of the first and second lifting plates 500 and 500' is formed on the vertical guide levers 700 and 700' to be interlocked with the first and second lifting plates 500 and 500'.

Vertical guide rods 720 and 720' which separate the sides of a disk when a disk loading is finished, are formed at one side of the vertical guide levers 700 and 700', respectively. Here, a guide groove (not shown) for guiding the movement of the vertical guide rods 720 and 720' is formed at the upper chassis 100.

The interference avoiding slots 540 and 540' are bent to allow the vertical guide levers 700 and 700' attached on the first and second lifting plates 500 and 500'; to deviate from the disk at the moment when loading of the disk is finished.

The construction for clamping a disk will now be described with reference to FIGS. 3, 9, 10, and 11.

Figure 9:
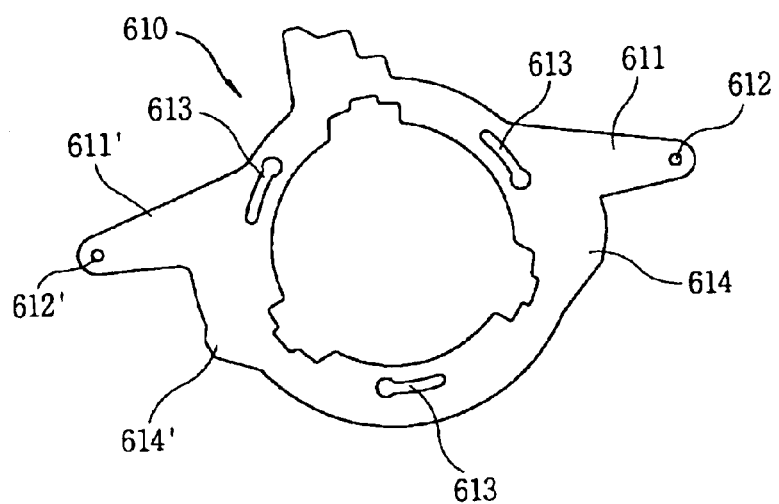
FIG. 9 is a plane view illustrating the construction of a clamping driving member of a disk drive in accordance with the present invention.
Figure 10:
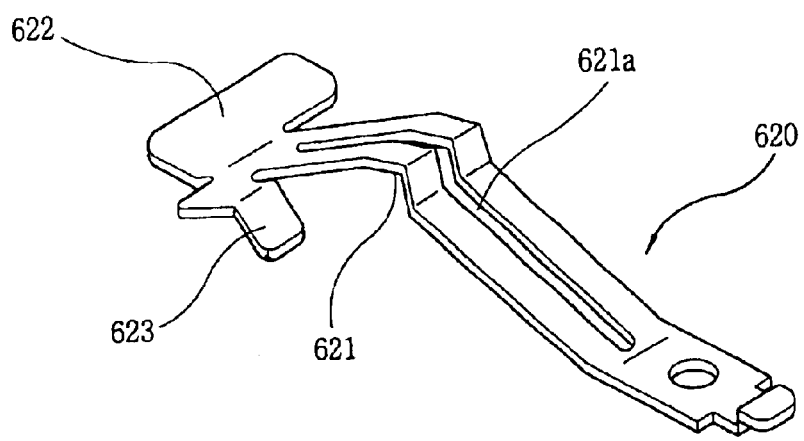
FIG. 10 is a schematic view illustrating the construction of an elastic supporting arm of a disk drive in accordance with the present invention.
Figure 11:
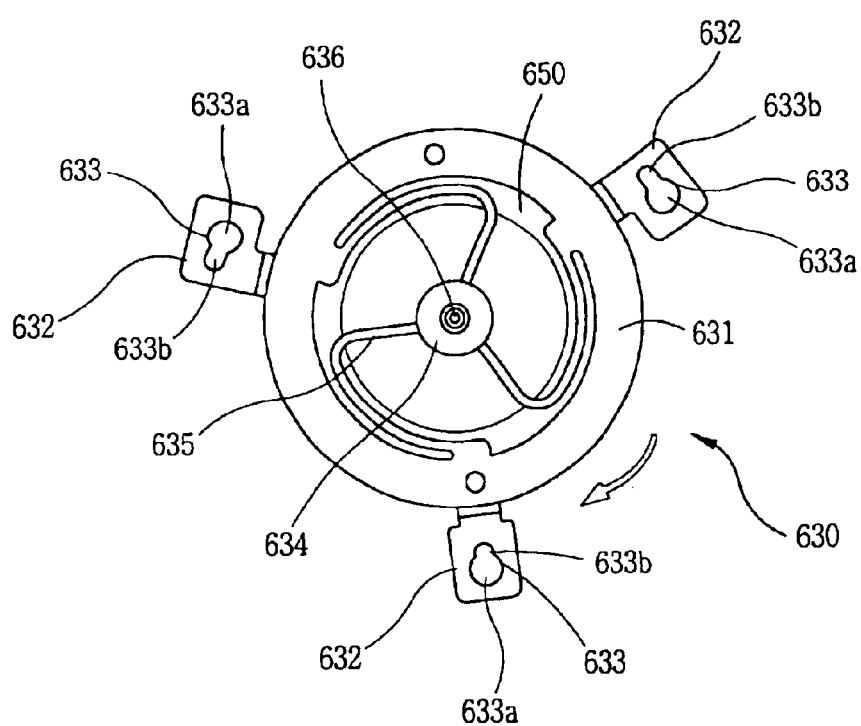
FIG. 11 is a plane view illustrating the construction of an elastic pressing member of a disk drive in accordance with the present invention.
Figure 12:
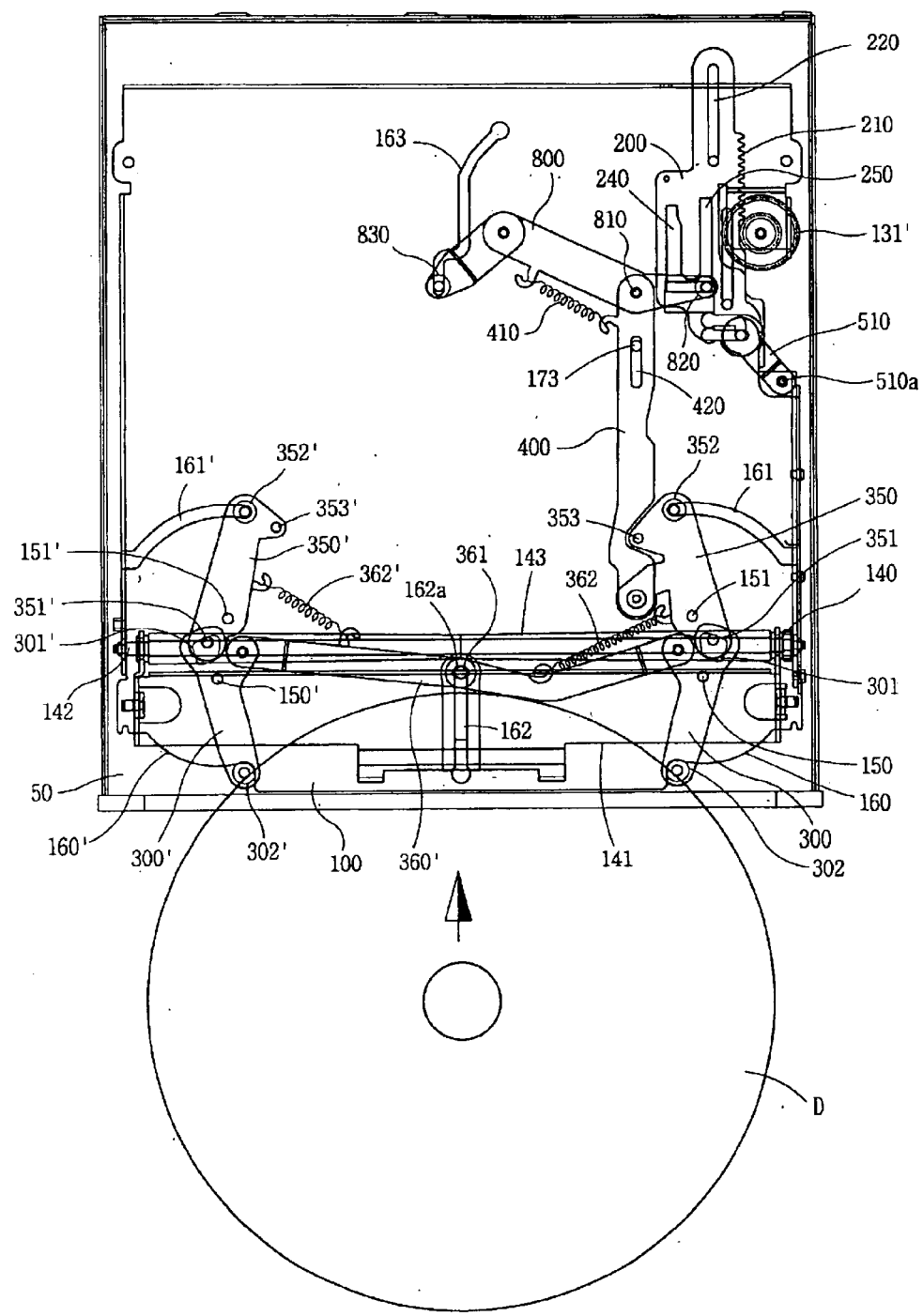
FIGS. 12 through 17 are operational view sequentially illustrating the transferring of a 12 cm disk in a disk drive in accordance with the present invention.
Figure 13:
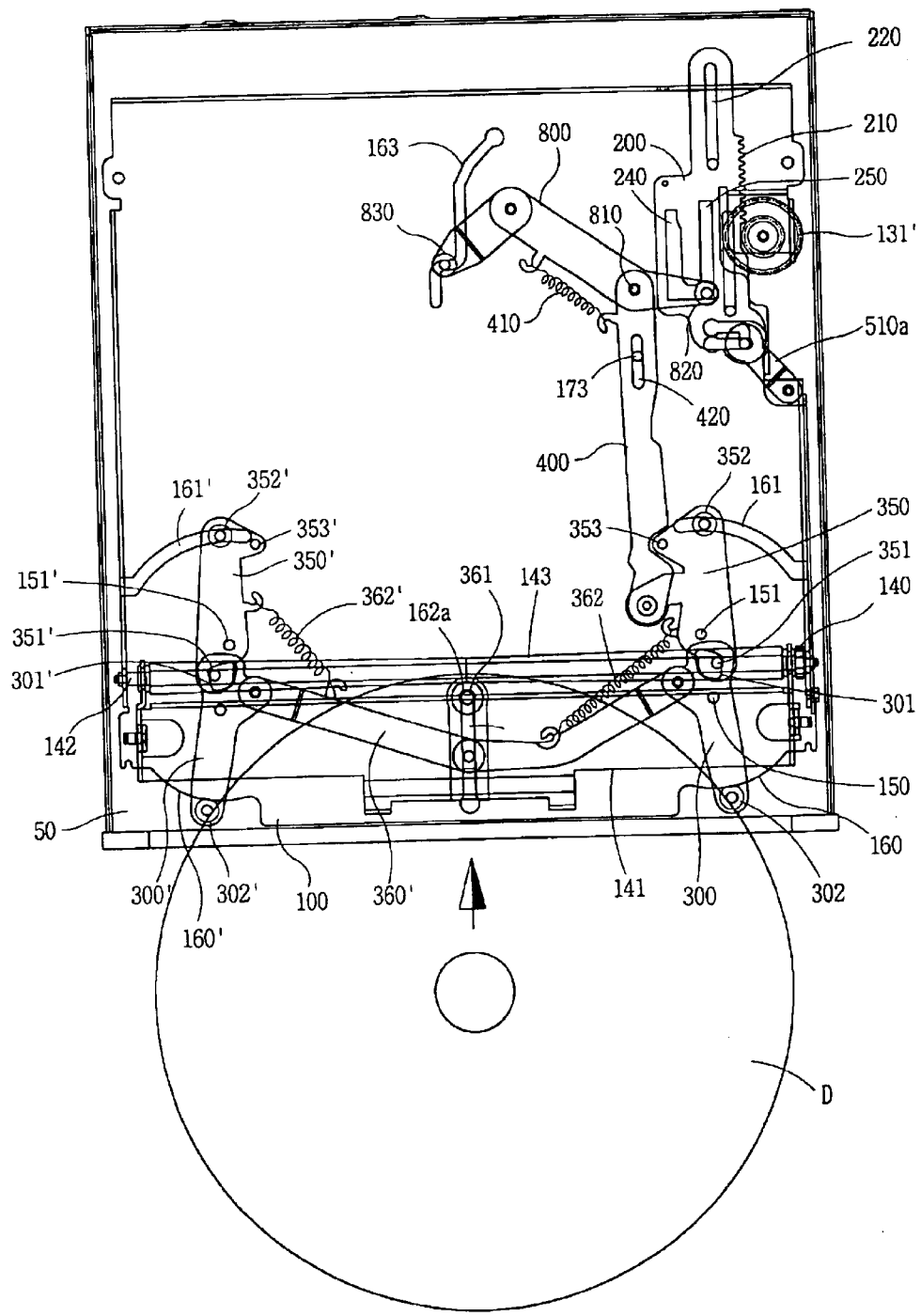
Figure 14:
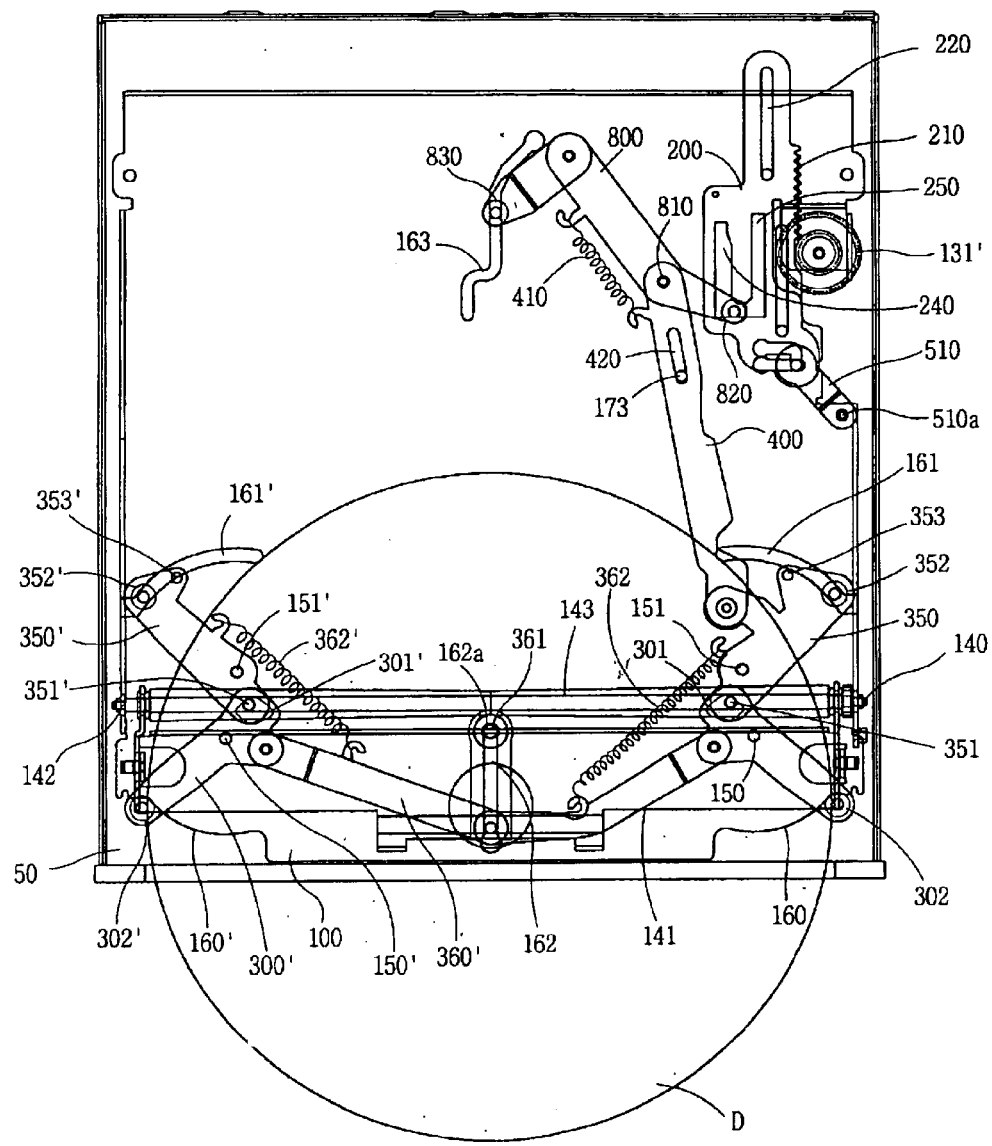

FIG. 9 is a plane view illustrating the construction of a clamping driving member 610 of a disk drive in accordance with the present invention. FIG. 10 is a schematic view illustrating the construction of an elastic supporting arm 620 of a disk drive in accordance with the present invention. FIG. 11 is a plane view illustrating the construction of an elastic pressing member 630 of a disk drive in accordance with the present invention. As illustrated in FIGS. 9 to 11, the clamping device for clamping a disk on the turn table includes a clamping driving member 610, an elastic supporting arm 620, and an elastic pressing member 630.

The clamping driving member 610 installed on the upper chassis 100 is approximately formed in a hollow disk shape. First and second interlocking arms 611 and 611' are formed respectively at two opposing perimeter portions of the clamping driving member 610, and interlocking pins 612 and 612' are protrusively formed at end portions of the interlocking arms 611 and 611' in an upward direction. The first interlocking arm 611 receives driving force from the first lifting plate 500. The interlocking pin 612 of the first interlocking arm 611 is located in the guide slot 520 of the fist lifting plate 500 and is moved by the movement of the first lifting plate 500.

In addition, the second interlocking arm 611' is driven in connection with the second lifting plate 500' functioning in the same manner as the first lifting plate 500. A plurality of driving guide slots 613 having a predetermined curvature are formed at the top surface of the clamping driving member 610, and a fifth guide pin 175 (refer to FIG. 3) installed on the upper chassis 100 is located at the respective driving guide slot 613. The driving guide slots 613 guide the fifth guide pin 175, thus achieving the rotation of the clamping driving member 610.

In the case that an 8 cm disk is inserted, cam portions 614 and 614' for separating the holder rods 352 and 352' of the first and second holder levers 350 and 350' from the sides of the disk while interlocking with the bosses 353 and 353' of the first and second holder levers 350 and 350', are formed at an outer perimeter of the clamping driving member 610. At each predetermined portion of the inner perimeter of the clamping driving member 610, a plurality of, for example three, elastic supporting arms 620 as illustrated in FIG. 10 are installed.

An elastic supporting arm 620 is curved and extended a number of times from its one end portion which is connected to the clamping driving member 610. The elastic supporting arm 620 has an elastic curved portion 621 having a guide slot 621a at the center thereof, and a supporting flap 622 extended from the elastic curved portion 621 for thereby pressing a disk mounted on the turntable (not shown).

In addition, a guide flap 623 functioning as a cam for lifting the supporting flap 622 is formed at a side portion of one end of the elastic curved portion 621. Namely, the guide flap 623 is moved by the rotation of the clamping driving member 610 while being in contact with a sloping side (not shown) formed at the upper chassis 100. Whereby, the guide flap 623 helps a clamper 650 to be downwardly biased towards the turntable (not shown) so that it presses the disk before clamping the same by varying the height of the supporting flap 622.

Here, one of the supporting flaps 622 of the plurality of the elastic supporting arms 620 is positioned relatively higher than the other supporting flaps 622, so that the clamper 650 receives power sequentially, rather than simultaneously, when the supporting flap 622 deviates the clamper 650 from the turn table (not shown).

Meanwhile, on the clamping driving member 610, an elastic pressing member 630 for pressing the clamper 650 in the direction of the turn table (not shown), that is, in a downward direction, when the clamper 650 presses the disk.

The elastic pressing member 630, as illustrated in FIG. 11, comprises a ring-shaped body unit 631, and fixing flaps 632 are formed at the outer perimeter of the ring-shaped body unit 631 at an interval of about 120°. The fixing flap 632 has a fixing hole 633 punched thereon. The fifth guide pin 175 of the upper chassis 100 passing through the driving guide slot 613 of the clamping driving member 610 is inserted into the fixing hole 633. Here, the fixing hole 633 consists of an insertion portion 633a having a larger diameter than the head portion of the fifth guide pin 175, and a fixing portion 633b having a smaller diameter than the head portion of the fifth guide pin 175. The fixing hole 633 formed on one of the fixing flaps 632 is formed in the radial direction of the body unit 631, while the other fixing holes 633 are formed in the circumferential direction of the body unit 631, for the purpose of fixing the elastic pressing member 630 on the fifth guide pin 175 by its own elasticity alone without any additional elements, such as washers.

A pressing plate 634 is provided at the center of the elastic pressing member 630, said pressing plate 634 supported by three elastic legs 635 formed in a thin streamline shape (air vane shape).

Here, the elastic leg 635 is formed to be twisted between its one end portion and the other end portion, and at the same time the portion of the elastic leg 635 connected to the fixing flap 632 is formed relatively higher than the portion connected to the pressing plate 634. Thus, the pressing plate 634 is formed to be always pressed in a downward direction.

At the center of the pressing plate 634, a guide opening 636 is formed, and, at the guide opening 636, a guide boss (not shown) formed at the center of the clamper 650 is located.

In the disk drive having a disk transferring and clamping device thusly constructed in accordance with the present invention, the movement of a 12 cm disk will now be described with reference to FIG. 12 through 17.

FIGS. 12 through 17 are operational views sequentially illustrating the transfer of a 12 cm disk in a disk drive in accordance with the present invention. As illustrated therein, when the user inserts a disk D with a diameter of 12 cm into the disk drive, the disk D contacts the balance rods 302 and 302' of the first and second balance levers 300 and 300'.

In the case that the disk D is not inserted into the front center of the disk drive, but partially inserted by pressing only one of the balance rods 302 and 302', since the connecting pin 361 is caught in the partial insertion prevention unit 162a of the slot 162 formed at the upper chassis 100, the first and second balance levers 300 and 300' do not move and the disk D cannot be inserted. When the disk D is inserted while simultaneously contacting the balance rods 302 and 302' at both sides, equal pressure is applied and the connecting pin 361 is moved along the slot 162. Accordingly the first and second balance rods 302 and 302' are moved along the guide surfaces 160 and 160' of the upper chassis 100.

When the disk D contacts the roller 143 by being further inserted, and the insertion of the disk D is sensed by a sensor (not shown), the driving motor 110 is operated. When the driving motor 110 is operated, the roller shaft 142 is rotated as the roller gear 140 is rotated by the loading worm wheel 120 via the driving pulley 112, belt 113, slave pully 114, and driving source 115. As the roller 143 is driven by rotation of the roller shaft 142, the disk D begins to be transferred.

Figure 15:
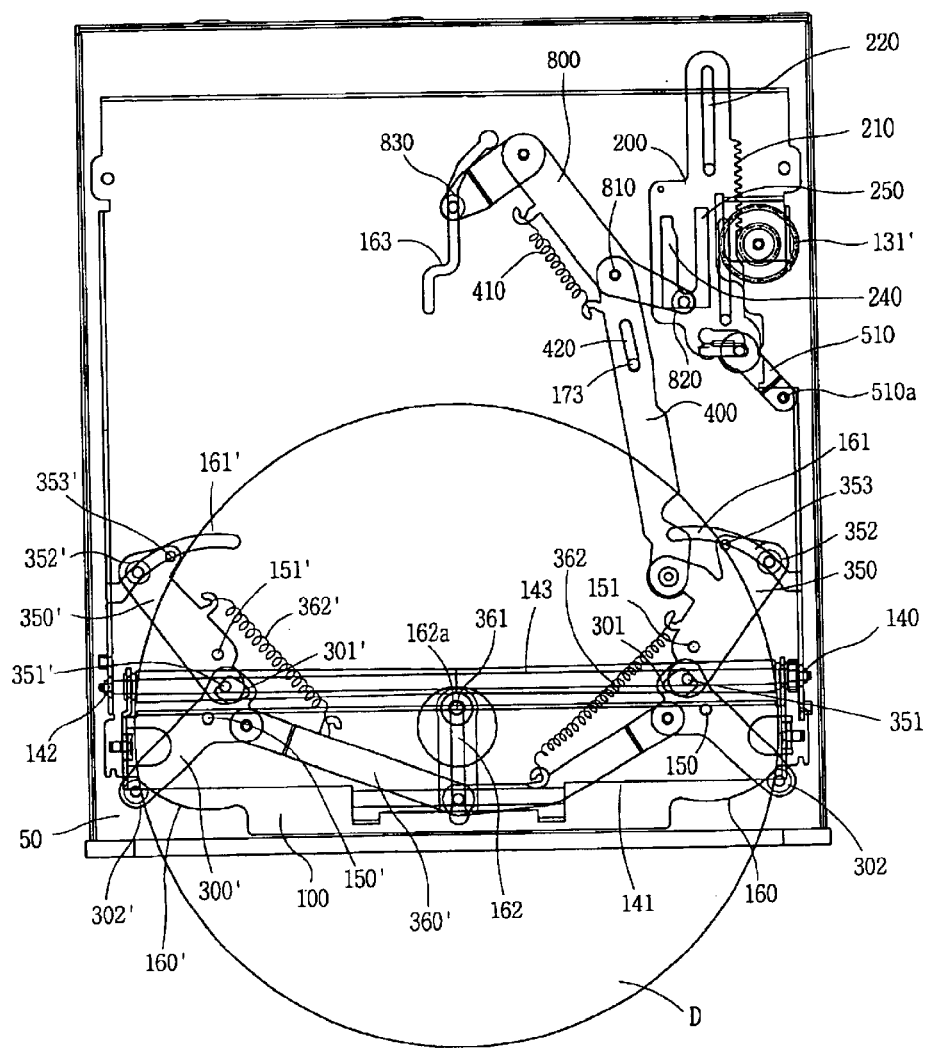
Figure 16:
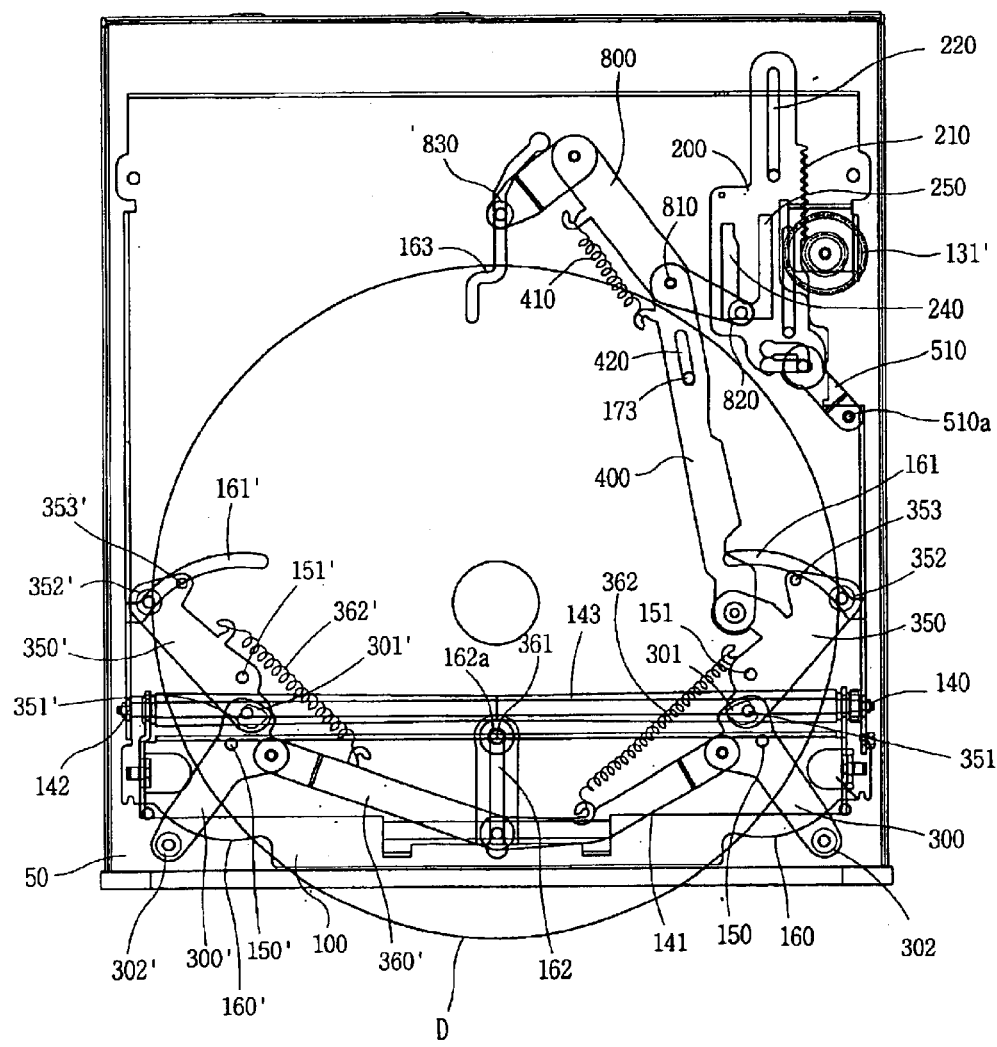

As the disk D is transferred by the roller 143, the first and second balance rods 302 and 302' move further along the guide surfaces 160 and 160' due to the insertion power of the disk D while still being in contact with the perimeter of the disk D. When the disk D is further transferred, the holder rods 352 and 352' of the fist and second holder levers 350 and 350' located at one end of the guide slots 161 and 161 are expanded as illustrated in FIG. 15 by being interlocked with the moving first and second balance levers 300 and 300'. Thereafter, the holder rods 352 and 352' further guide the disk D while being in contact with the perimeter of the disk D as illustrated in FIG. 16.

At the same time, the selection lever 800 connected to the supporting lever 400 interlocking with the first holder 350 is moved, as, the supporting rod 830 formed at one end portion of the selection lever 800 moves along the supporting rod slot 163. The guide boss 820 formed at the other end portion of the selection lever 800 is located in the first selection slot 240 of the driving plate 200.

Figure 17:
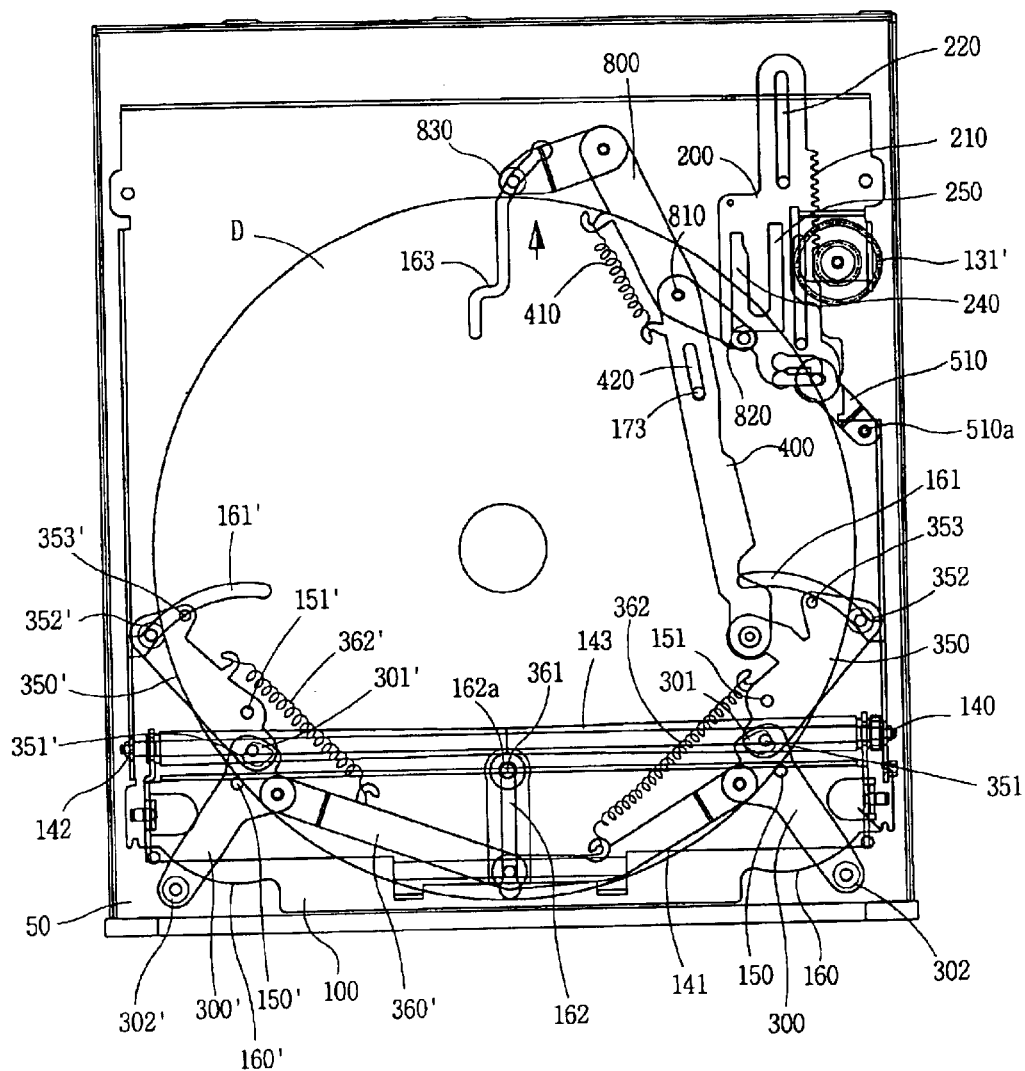
Figure 18:
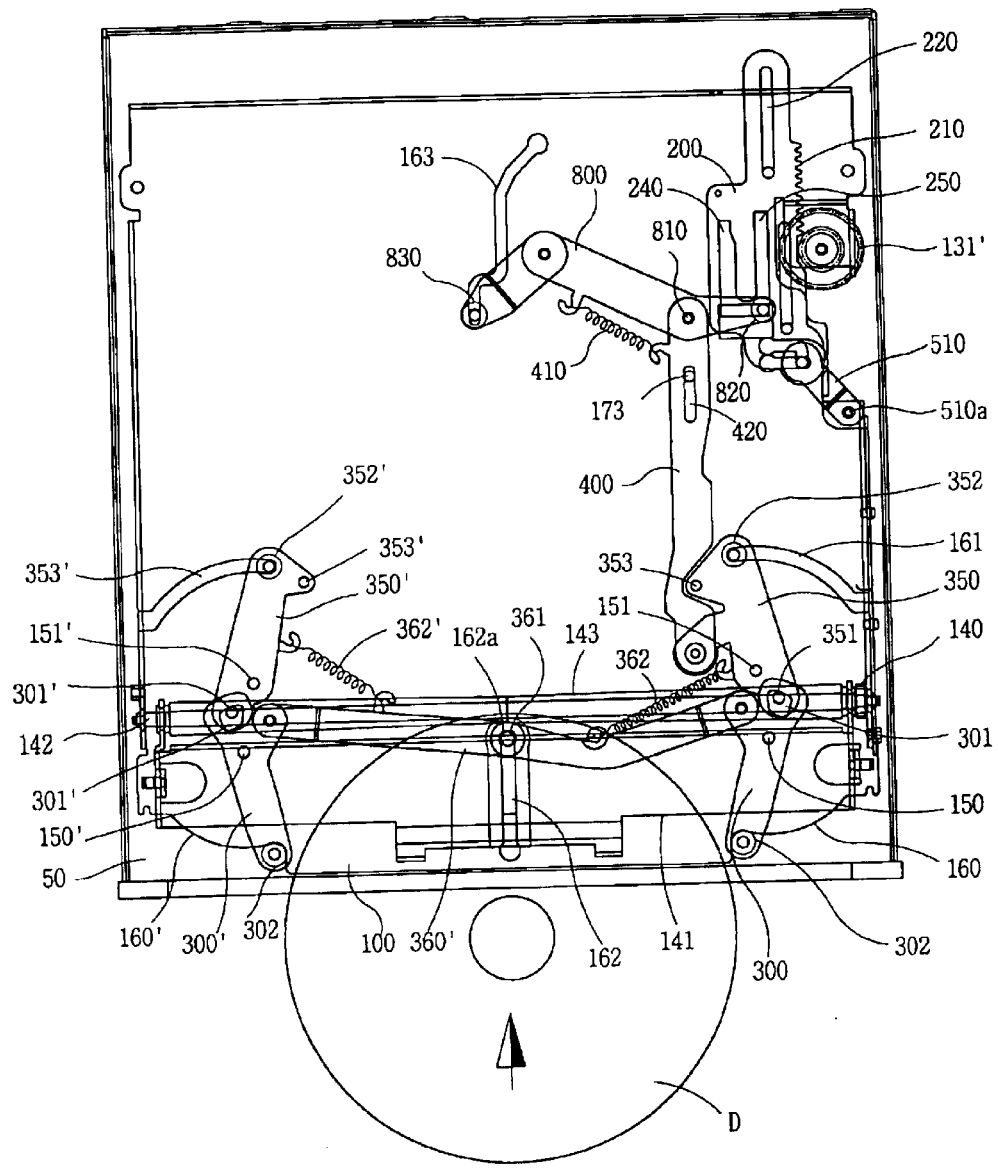
FIGS. 18 through 21 are operational view sequentially illustrating the transferring of an 8 cm disk in a disk drive in accordance with the present invention.
Figure 19:
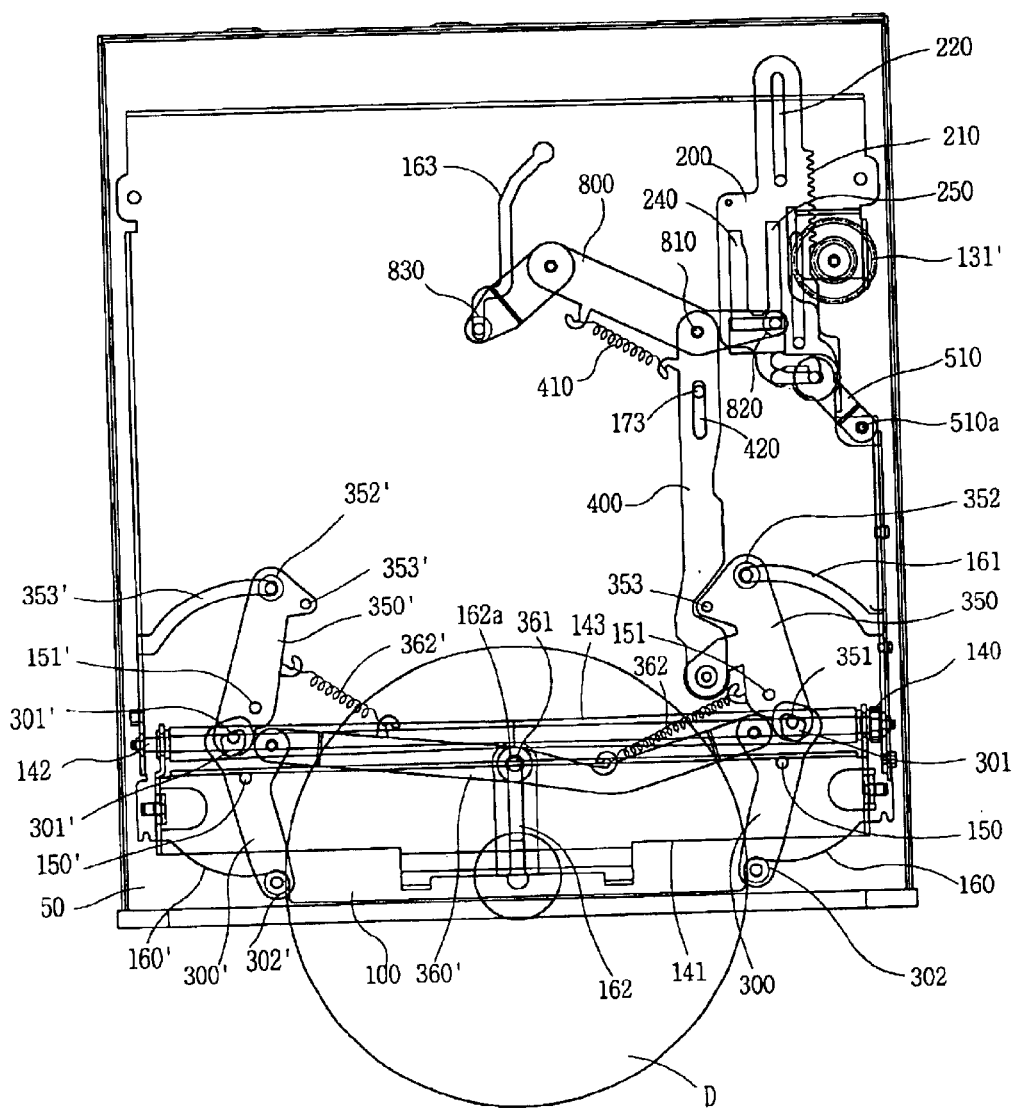
Figure 20:
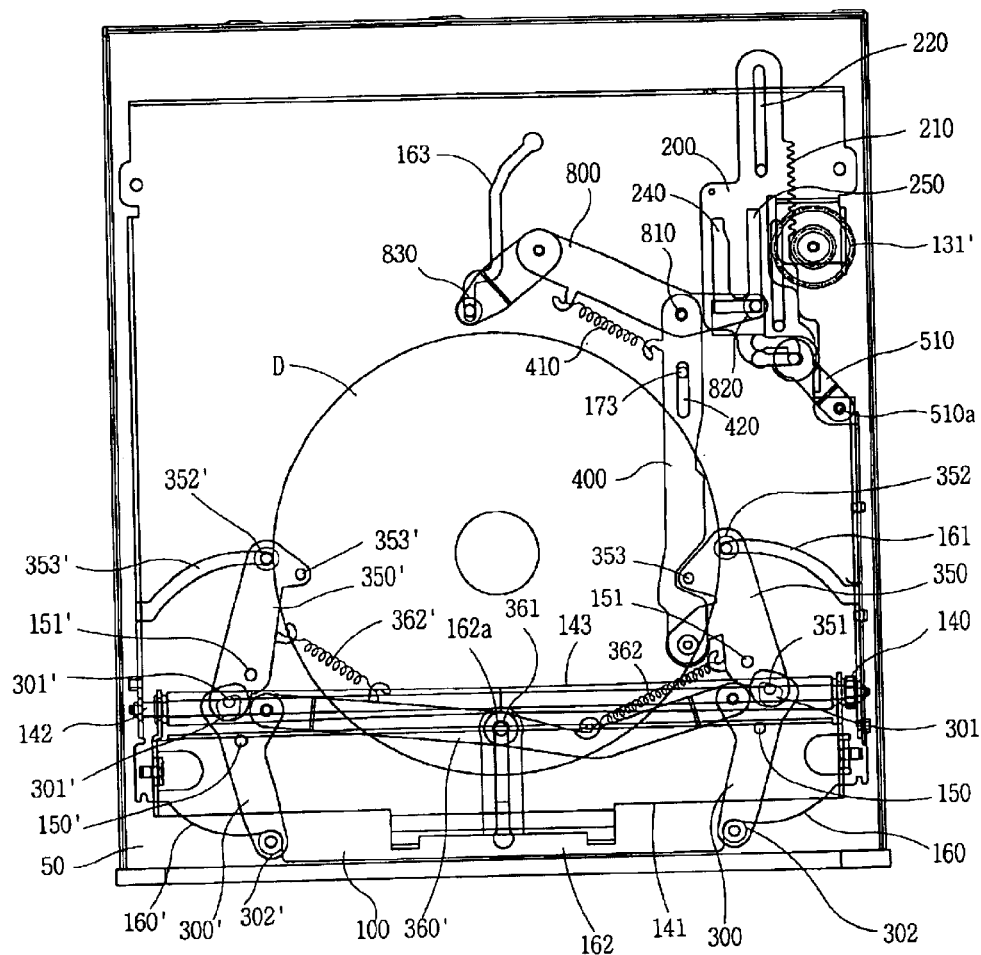
Figure 21:
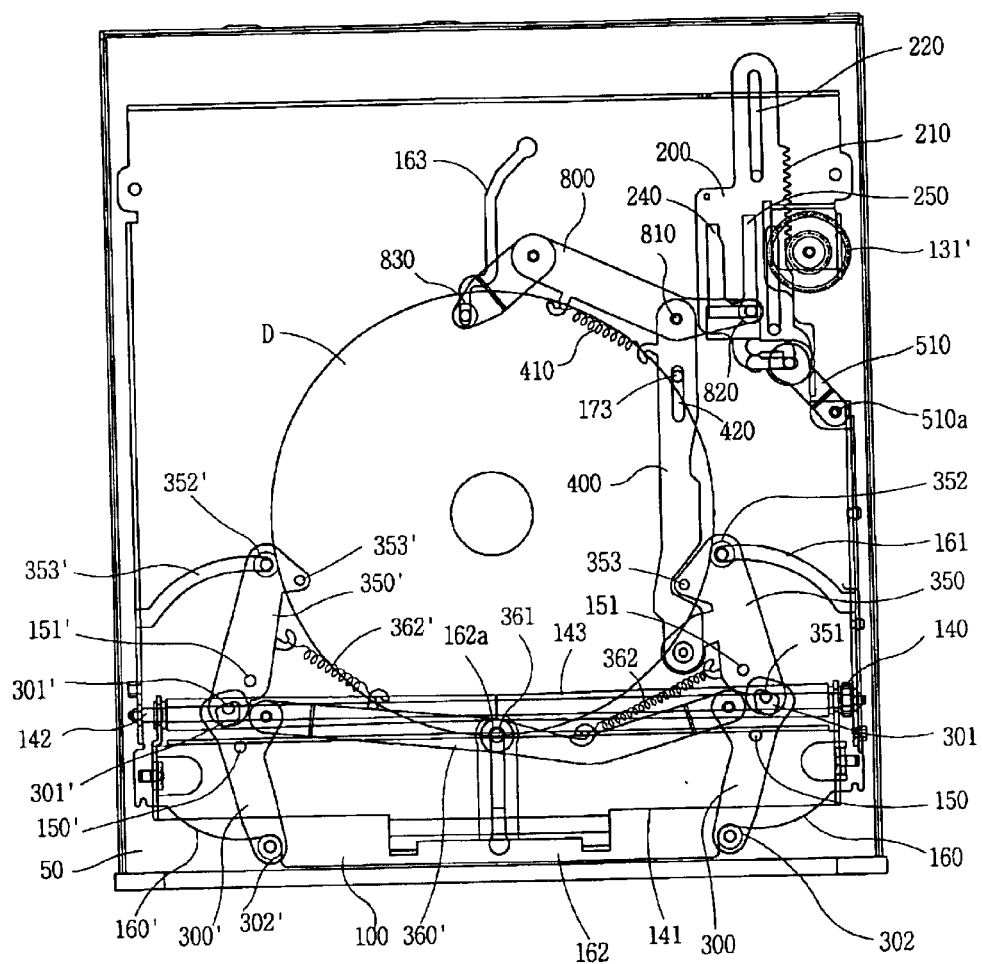

When the disk D is further inserted, its front end presses the supporting rod 830 of the selection lever 800, and the selection lever 800 is pushed away, while the selection lever 800 moves the driving plate 200 via the guide boss 820 as illustrated in FIG. 17.

In this manner, when the driving plate 200 is moved, the power of the driving motor 110 is transmitted to the driving plate 200 as the rack gear portion 210 of the driving plate 200 and the driving gear 131' are engaged with one another. Therefore, the driving plate 200 is moved towards the front plate 2, and the first lifting plate 500 is moved by the movement of the driving plate 200.

When the first lifting plate 500 begins to be moved, the clamping of the disk D is implemented as the clamping driving member 610 is rotated due to the interlocking pin 612 located in the driving hole of the first lifting plate 500.

The clamping process will be described as follows. The clamping driving member 610 is rotated by the driving of the first lifting plate 500 in a clockwise direction along the driving guide slots 613 having a predetermined curvature in which fifth guide pins 175 are located. When the clamping driving member 610 is rotated, the elastic supporting arms 620 installed at the clamping driving member 610 elastically move as well.

When the elastic supporting arms 620 move, the guide flaps 623 move into contact with the sloping side (not shown) of the upper chassis 100, whereby the supporting flaps 622 are pressed toward the turntable (not shown) by the elastic reformation of the elastic curved portions 621 of the elastic supporting arms 620. Accordingly, the lower surface of the supporting flaps 622 press the surface of the inserted disk D. When the clamping driving member 610 is further rotated, the vertical distance of the supporting flap 622 is increased again by the relation between the elastic curved portion 621 and the upper chassis 100. As a result, the supporting flaps 622 are separated from the surface of the disk D, while the clamper 650 is pressed down onto the disk D on the turntable, thus completing the clamping operation.

The operation of deviating the roller 143 being in contact with the lower surface of the disk D by the first and second lifting plates 500 and 500' is as follows.

As the first lifting plate 500 is moved along the driving plate 200, the roller shaft 142 is guided toward a lower part of an sloping cam portion 550. Whereby, the roller bracket 141 is pivoted on the hinge point 141a for thereby deviating the roller 143 from the bottom surface of the disk D. Herein, the moving direction of the second lifting plate 500' is opposite to the direction of the first lifting plate 500, which is because the clamping driving member 610 is rotated in a clockwise direction in connection with the second interlocking arm 611' of the clamping driving member 610.

The first and second holder rods 352 and 352' in contact with the perimeter of both sides of the disk D are also separated from the perimeter of the disk D as the bosses 353 and 353' are guided along the cam portions 530 and 530' of the first and second lifting plates 500 and 500'. In addition, the vertical guide rods 720 and 720' of the first and second vertical guide levers 700 and 700' in contact with the perimeter of both sides of the disk D along with the first and second holder rods 352 and 352' are separated from the perimeter of the disk D, as they are guided to the bent end portions of the first guide slots 540 and 540' on the first and second lifting plates 500 and 500'.

The supporting rod 830 of the selection lever 800 is separated from the disk D as the guide boss 820 of the selection lever 800 is guided to a curved portion of an upper side of the first guide slot 240 of the driving plate 200, thereby completing the clamping operation and reproducing or recording a signal of the disk D can then be performed.

Meanwhile, FIGS. 18 through 21 are operational views sequentially illustrating the transfer of an 8 cm disk in a disk drive in accordance with the present invention. When more than half the 8 cm disk is inserted into the drive, both ends of the disk is guided by the balance rods 302 and 302' of the first and second balance levers 300 and 300'.

As the disk D is moved forward by the roller 143, the holder rods 352 and 352' of the first and second holder levers 350 and 350' are separated from the sides of the disk D when the cam portions 614 and 614' formed at the clamping driving member 610 are interlocked with the bosses 353 and 353' of the holder levers 350 and 350'. In addition, the guide boss 820 of the selection lever 800 is guided into the second guide slot 250.

Hereinafter, the disk transfer operation or the clamping operation for an 8 cm disk is the same as the operation of the 12 cm disk D described above, so the detailed description thereof is omitted.

As described above, in the disk transfer device in accordance with the present invention, it is possible to use 12 cm and 8 cm disks in one drive and the disk is guided by a plurality of levers interlocking with each other. Thus, the disk moving operation is always performed precisely, thereby increasing the reliability of the product, and achieving the lightening, thinning, shortening, and miniaturizing of the disk drive.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalencies of such metes and bounds are therefore intended to be embraced by the appended claims.

What is claimed is:

1. A disk transferring device for a disk drive, comprising:
   a moving unit for being contacted to one surface of a disk and rotated by the force of a driving source for thereby moving the disk;
   a balance guide unit for guiding the disk for thereby precisely inserting the disk;
   a holder guide unit which is connected with the balance guide unit and is operated by operation of the balance guide unit for guiding the disk moved by the moving unit and guiding the disk until the disk transfer is finished a supporting lever;
   a selection guide unit which is connected with the holder guide unit via the supporting lever for positioning the disk according to the size of the disk; and
   a clamping driving unit for clamping the disk, the clamping driving unit being interlocked with the selection guide unit.

2. The device of claim 1, wherein the holder guide unit or selection guide unit receives the driving force separated from the disk from the driving source when the disk transfer is finished.

3. The device of claim 2, wherein the holder guide unit interlocks with the clamping driving unit for thereby being separated from the disk.

4. The device of claim 2, wherein the selection guide unit interlocks with the clamping driving unit for thereby being separated from the disk.

5. The device of claim 1, wherein the disk transferring device further comprises a chassis, and a guide slot having a partial insertion preventing unit is formed at the chassis, a balance guide unit is installed at both ends of a disk insertion opening of the chassis, a guide rod contacting the perimeter portion of the disk during disk insertion is installed at one end of the balance guide unit, and a connecting pin inserted into the guide slot to be guided thereby is installed at the other end thereof.

6. The device of claim 1, wherein the power of the driving source is transmitted through a main power transmission system having a plurality of gears for transmitting the driving force of the driving source;
   a disk transferring power transmission system having a plurality of gears receives the driving force from the main power transmission system and converts the same to the transferring of the disk; and
   a clamping power transmission system selectively receives the driving force from the main power transmission system and converts the same to the clamping driving of the disk.

7. The device of claim 6, wherein the clamping power transmission system includes a driving plate for receiving power and transmitting the power to the lifting plate, the driving plate has a rack gear portion formed thereon, and a first gear tooth of the rack gear portion is formed to be rounded for thereby preventing collision with the opposite gear tooth engaged with the first gear tooth.

8. The device of claim 7, wherein, at the driving plate, a selection slot is formed for selectively guiding the selection guide unit according to the type of disk used.

* * * * *